United States Patent [19]

Connell et al.

[11] Patent Number: 4,638,470
[45] Date of Patent: Jan. 20, 1987

[54] APPARATUS USING BEAM SPLITTER CUBE WITH SPECIFIC CHARACTERISTICS FOR READING INFORMATION RECORDED IN A MAGNETO-OPTIC MEDIUM

[75] Inventors: G. A. Neville Connell, Cupertino; Jimmy D. Godwin, San Jose, both of Calif.

[73] Assignee: Xerox Corporation, Stamford, Conn.

[21] Appl. No.: 608,581

[22] Filed: May 9, 1984

[51] Int. Cl.$^4$ .............................. G11B 11/00
[52] U.S. Cl. ..................... 369/13; 369/110; 360/114
[58] Field of Search ................... 369/13–15, 369/100, 110, 111, 112, 44–46, 121–122; 360/114, 59; 365/121–122; 350/400–402

[56] References Cited

U.S. PATENT DOCUMENTS

| | | | |
|---|---|---|---|
| 3,705,395 | 12/1972 | Aagard et al. | 365/122 |
| 3,781,905 | 12/1973 | Bernal et al. | 365/122 |
| 4,392,722 | 7/1983 | Shirasaki | 350/402 X |
| 4,409,631 | 10/1983 | Matsumoto | 369/110 X |
| 4,423,495 | 12/1983 | Musha et al. | 369/45 |
| 4,426,693 | 1/1984 | Satoh et al. | 369/45 |
| 4,429,378 | 1/1984 | Sato | 350/402 X |
| 4,451,863 | 5/1984 | Yanagida et al. | 369/13 X |
| 4,451,913 | 5/1984 | Elliott | 369/111 X |
| 4,466,035 | 8/1984 | Connell et al. | 360/59 X |
| 4,472,748 | 9/1984 | Kato et al. | 369/111 X |
| 4,549,287 | 10/1985 | Hatano et al. | 369/13 X |
| 4,558,440 | 12/1985 | Tomita | 369/13 |

FOREIGN PATENT DOCUMENTS 115642  7/1983  Japan ..................... 369/13

OTHER PUBLICATIONS

G. A. N. Connell, D. Treves, R. Allen, M. Mansuripur, "Signal-to-Noise Ratio for Magneto-Optic Readout from Quadrilayer Structure", *Applied Physics Letters*, 4/15/83, vol. 42, No. 8, pp. 742–744.

R. P. Netterfield, "Practical Thin-Film Polarizing Beam-Splitters", *Optica Acta*, 1977, vol. 24, No. 1, pp. 69–79.

*Primary Examiner*—Raymond F. Cardillo
*Assistant Examiner*—Wayne R. Young
*Attorney, Agent, or Firm*—Leonard Zalman

[57] ABSTRACT

A system for providing a read signal from a magneto-optic medium wherein a non-rotated leaky beam splitter is utilized to provide both s and p components of the light reflected from the medium to a differential detector arrangement. The beam splitter, which may be of conventional construction and which has the reflected beam striking its medium-facing face at normal incidence, is operated in a leaky mode by utilizing it with a read beam having a wavelength differing from the wavelength for which the beam splitter was designed. One face of the beam splitter can be cut at a small angle off normal to prevent any p-polarized light from entering the differential detector arrangement directly from the light source.

1 Claim, 5 Drawing Figures

APPARATUS USING BEAM SPLITTER CUBE WITH SPECIFIC CHARACTERISTICS FOR READING INFORMATION RECORDED IN A MAGNETO-OPTIC MEDIUM

BACKGROUND OF THE INVENTION

Systems have heretofore been proposed which utilize the polar Kerr effect to provide a read signal from a magneto-optic storage disk. The polar Kerr effect itself is observed by the changes in the state of polarization of light that occurs after normal reflection from a perpendicularly magnetized medium. In one such system, the p-polarized light from a laser is passed through a polarizing beam splitter to the magneto-optic medium. The light reflected from the medium has both s and p components because of the polar Kerr effect in the medium. The p and s components refer to light vibrating parallel and perpendicular to the plane of incidence, respectively. The phase direction of the s component contains the information about the magnetization direction of the magnetic domains of the medium which represent encoded information. The phase direction of the s component, for example, up or down, can be measured by referencing it to the phase direction of the p component. See "Signal-to-noise ratio for magneto-optic readout from quadrilayer structures" by G. A. N. Connell et al, *Applied Physics Letters,* 42 (8), Apr. 15, 1983, pp. 742–4.

The s component and the p component of the reflected light are incident upon the aforenoted beam splitter which is commonly composed of an isoleses right-angled prism, the hypotenus face of which is coated with a number of thin-film layers of alternate high and low refractive index materials and then cemented to an identical uncoated prism. Beam splitters are designed to work at a particular wavelength for light striking the front face of the cube at normal incidence, with the optical thickness of each layer equal to a quarter of the design wavelength. Beam splitters so configured give very high reflectance of the s component of the read beam while providing a very high transmission of the orthogonally polarized p component, as shown in FIG. 1. Thus, normal incidence of the read beam on the media-facing face of the beam splitter will not provide a p component traveling in the same direction as that of the s component, and thus the phase or polarization direction of the s component cannot be measured by reference to the phase or polarization direction of the p component.

In one published magneto-optic medium readout system, see the previously referenced Connell et al article, the polarizing beam splitter is rotated about the vertical axis by an angle $\theta$ such that a small fraction of the p component (and a large fraction of the s component) are permitted to leak into a differential detector arrangement, with the p component providing the needed reference for measuring the phase of the s component. The rotation of the polarizing beam splitter is, therefore, allowing it to behave as a low quality, leaky splitter. However, the beam splitter rotation technique has a problem in that for a given rotation $\theta$ of the beam splitter, for example, $\theta = 10°$, the optics of the differential detector arrangement must be rotated by $2\theta$ or $20°$, as shown in FIG. 2. The latter rotation consumes too much space in the optics module and hence the rotated polarizing beam splitter arrangement is disadvantageous.

SUMMARY OF THE INVENTION

A system for providing a read signal from a magneto-optic medium wherein a non-rotated leaky beam splitter is utilized to provide both s and p components of the light reflected from the medium to a differential detector arrangement. The beam splitter, which may be of conventional construction and which has the reflected beam striking its medium-facing face at normal incidence, is operated in a leaky mode by utilizing it with a read beam having a wavelength differing from the wavelength for which the beam splitter was designed. One face of the beam splitter can be cut at a small angle off normal to prevent any p-polarized light from entering the differential detector arrangement directly from the light source.

DETAILED DESCRIPTION OF THE INVENTION

Figure 1:
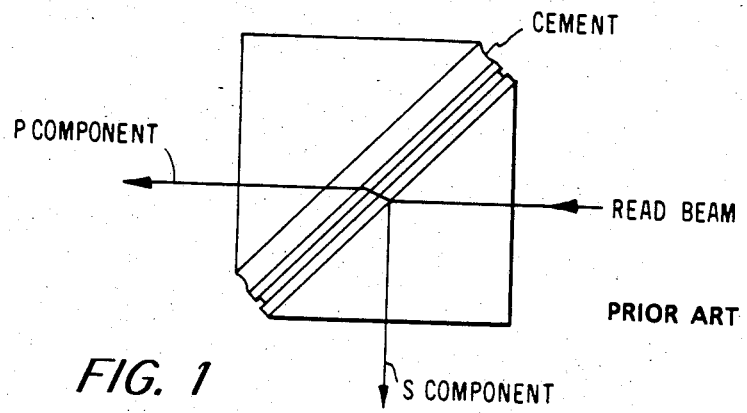
FIG. 1 is a side view of a conventional beam splitter cube.
Figure 2:
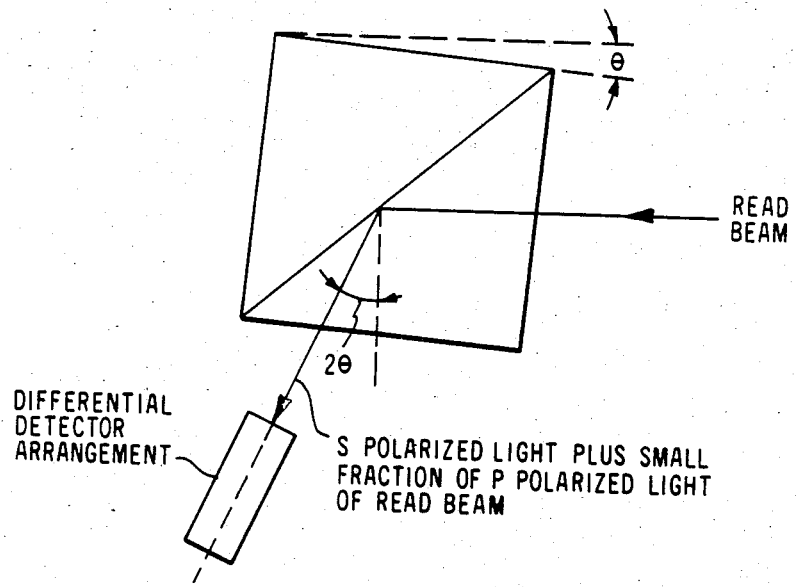
FIG. 2 shows a beam splitter cube oriented to reflect both s and p components of incident light.
Figure 3:
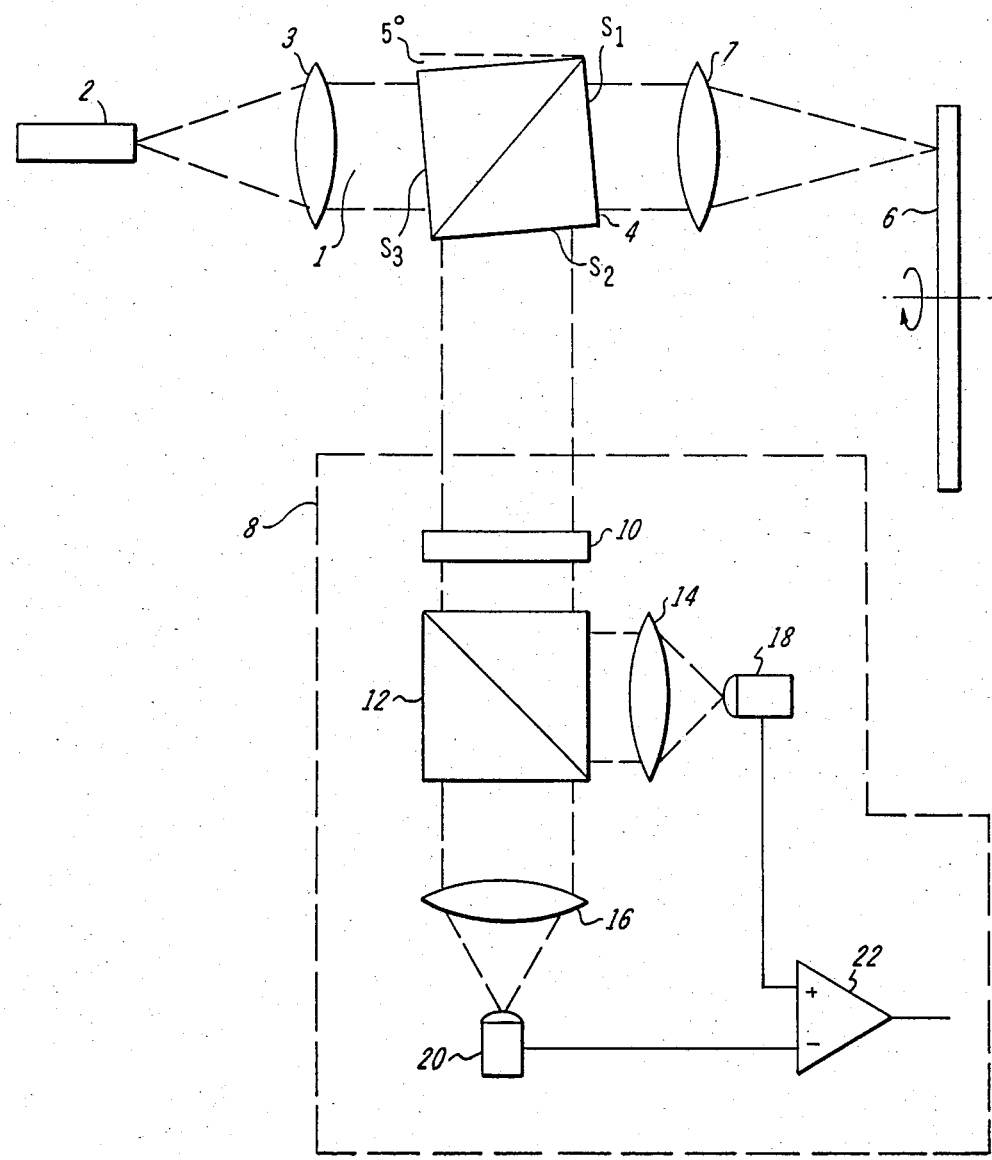
FIG. 3 shows a system for guiding a reflected light beam to a differential detector arrangement.

Referring now to FIG. 3, a collimated, linearly (horizontally) polarized light beam 1, provided by a laser beam source 2 and a collimating lens 3, is passed through a polarizing beam splitter cube 4 and is incident normally on a magneto-optic storage disk 6 via a focusing lens 7. Disk 6 includes a vertically (upwardly) magnetized film, for example, of a crystalline material such as MnBi, TbFeO$_3$, GdIG, etc., or an appropriate amorphous material such as GdCo, GdFe, TbFe, GdTbFe, etc., with encoded information appearing as downwardly magnetized domains. When the polarized light beam 1 irradiates the film, the reflected light has both s and p components because of the polar Kerr effect of the film. The polarization direction of the s component, for example, upward or downward, contains the information about the magnetization directions of the magnetic domains which represent encoded information.

The reflected light is then guided to a differential detector arrangement 8 by the same beam splitter 4. Notice that the beam splitter cube is oriented such that the vertical surfaces are parallel to the vertical axis, that is, parallel to the plane of the disk 6. The beam splitter 4 is designed to provide for a light beam of its design wavelength (not equal to the wavelength of light from source 2) very high reflectance of the s component of the read beam and very high transmission of the p component of the read beam. However, when used with light of the wavelength produced by the laser source 2, almost all of the s component of the read beam and, in addition, a small fraction, preferably about 10%, of the p component of the read beam are reflected by the beam splitter 4 toward the differential detector arrangement 8. As previously noted, the p component is needed since it acts as a reference for measuring the phase of the s component.

The differential detector arrangement can be that described in the previously referenced Connell et al article, including a phase plate 10, a second polarizing beam splitter 12, a pair of focusing lenses 14 and 16 with associated photodetectors 18 and 20, respectively, and a differential amplifier 22 receiving inputs from the photodetector pair. The phase plate 10 places the s and p components in phase and the beam splitter 12 directs more or less of the s component to one of the photodetectors 18/20 depending upon the direction of polarization of the s component. Thus, the sign of the output of the differential amplifier 22 is indicative of the polarization direction of the s component.

Figure 4:
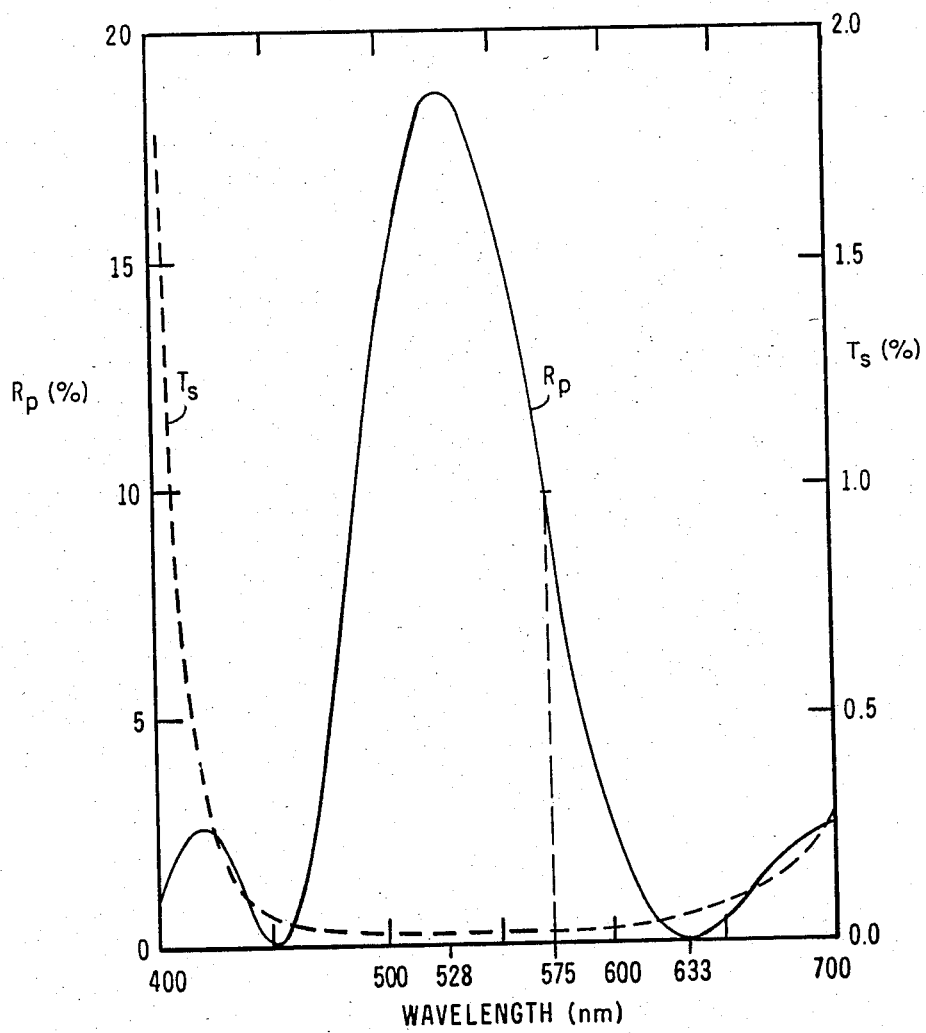
FIGS. 4 and 5 depict the reflectance of light by a beam splitter cube as a function of wavelength.
Figure 5:
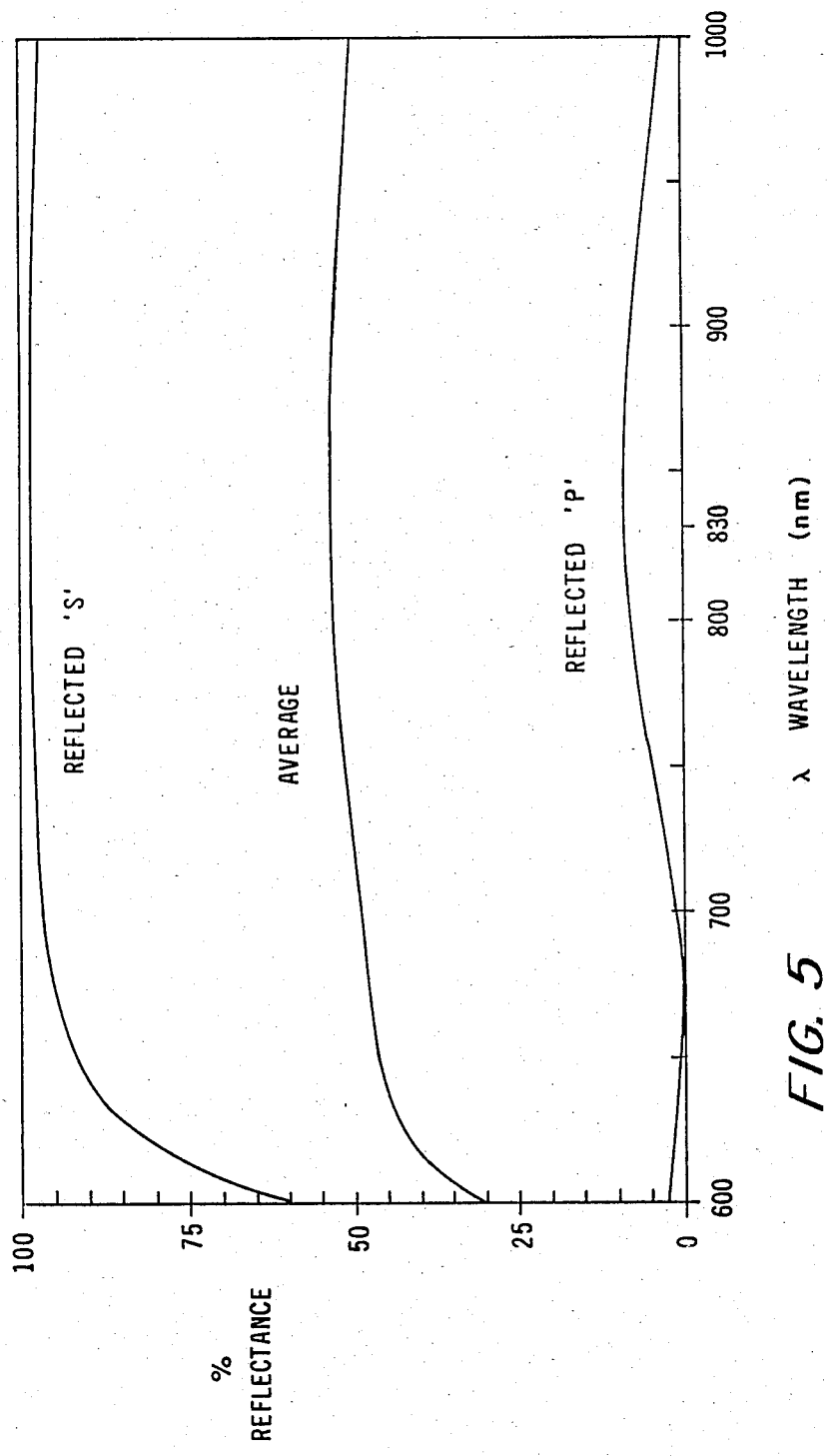

As noted, the beam splitter 4 is designed for operation with light of a particular wavelength striking its front face at normal incidence, that particular wavelength being different from the wavelength of the light provided by laser source 2. Beam splitter 4 is of conventional design and could be comprised, for example, of a 9-layer stack alternating between zinc sulphide and cryolite, that is, alternate layers of high and low refractive index materials, as taught by an article by R. P. Netterfield entitled "Practical thin-film polarizing beam-splitters" and appearing in OPTICA ACTA, 1977, Vol. 24, No. 1, 69–79. With reference to FIG. 4, that design, in which the optical thickness of the layers are equal and are chosen so that $R_p$ (the reflectance of the p component) is zero at the design wavelength $\lambda = 633$ nm, would provide a beam splitter in which $R_p$ is maximum at a wavelength of 528 nm and declines toward zero at greater and lesser wavelengths, while $T_s$ (the transmission of the s component) is very small at the design wavelength $\lambda = 633$ nm and at all wavelengths between about 450 nm and 700 nm (note the change of scale for $R_p$ and $T_s$). To provide a $R_p$ of about 10%, along with the desired almost total reflection of the s component, the beam splitter referenced would be utilized with light from source 2 at about 575 nm (one of the 10% $R_p$ points on the graph of FIG. 4). In the case where the source 2 is a gallium aluminum arsenide diode laser emitting at a wavelength of about 830 nm, the optical thickness of the layers would be $\lambda/4$ at $\lambda = 763$ nm, providing a graph of reflected s and p components versus $\lambda$ as shown in FIG. 5, noting that the p component has about 10% reflectance at $\lambda = 830$ nm. In general, and with reference to FIG. 3, the p polarization efficiency from side $S_1$ to side $S_2$ of beam splitter 4 should be between 7% to 12%, the p polarization efficiency from side $S_1$ to side $S_3$ of beam splitter 4 should be greater than about 85%, and the s polarization efficiency from side $S_1$ to side $S_2$ of beam splitter 4 should be greater than about 95%.

Referring again to FIG. 3, it is noted that one face of the beam splitter 4 is cut at a small angle, for example, 5% off normal. That cutting prevents any P-polarized light from the laser source 2 from entering the differential detector arrangement 8. That prevention could also be achieved by an anti-reflection coating, such as a quarter-wave layer of magnesium fluoride on that face, but the cut face arrangement is preferred.

We claim:

1. A system for providing a read signal from a magneto-optic storage medium having information encoded as directional magnetized domains, said system including first means for directing a focused, polarized light beam of a given wavelength $\lambda_1$ onto regions of the storage medium to provide an information beam having both s and p components due to the polar Kerr effect on the medium, and said system further including second means for measuring the phase direction of said s component of said information beam by referencing it to the phase direction of said p component of said information beam, said second means including a beam splitter cube, said beam splitter cube having the design characteristic of very high transmission of the p component of light of wavelength $\lambda_2$ and very high reflectance of the s component of light of wavelength $\lambda_2$, said wavelength $\lambda_2$ being different than said wavelength $\lambda_1$, said beam splitter cube being oriented such that said information beam of wavelength $\lambda_1$ strikes one of its faces at normal incidence, due to said beam splitter cube being of design wavelength $\lambda_2$ said beam splitter cube operates in a leaky mode when the information beam of wavelength $\lambda_1$ is incident thereon whereby said beam splitter cube directs a small portion of the p component of the information beam and a large portion of the s component of the information beam along a common path for utilization by other components of said second means.

* * * * *